United States Patent [19]

Filbert

[11] Patent Number: 4,875,938
[45] Date of Patent: Oct. 24, 1989

[54] METHOD OF MAKING A MORTAR BINDER AND PRODUCT

[76] Inventor: Norman V. Filbert, Bay City, Box 19-22, Stevensville, Md. 21666

[21] Appl. No.: 120,939

[22] Filed: Nov. 16, 1987

[51] Int. Cl.$^4$ .......................... C04B 2/04; C04B 2/10
[52] U.S. Cl. .................................. 106/120; 106/118; 423/173
[58] Field of Search ................................ 106/118, 120

[56] References Cited

PUBLICATIONS

Boynton, *Chemistry and Technology of Lime and Limestone*, 1966, pp. 10–12, 100, 101, 136, 270, 271, 287–290, 320, 398.

*Primary Examiner*—Mark L. Bell
*Attorney, Agent, or Firm*—Scrivener and Clarke

[57] ABSTRACT

A method of making a mortar binder including the steps of heating marine shell material to a predetermined high range of temperature, allowing the material to cool, mixing with the material a predetermined proportion of water, which may be sea water, allowing the mixture to react at a spontaneously generated temperature and allowing the mixture to cool until it converts into the binder of a homogeneous, substantially white fluffy powdery substance similar to fine ground talcum powder.

10 Claims, No Drawings

METHOD OF MAKING A MORTAR BINDER AND PRODUCT

This invention relates to cementitious mortar binders and more particularly to a method of making mortar binder and a mortar from said binder and to the binder produced by said method.

It is known to produce lime, that is to say, calcium oxide, by the action of heat on limestone, shells and other material containing calcium carbonate. This lime can be used as a binder in mortar or, when hydrated, can be used to neutralize acid soil.

I have discovered that an improved binder can be produced by first heating marine shell material, such as crab or oyster shells, to a predetermined high range of temperatures, allowing the heated shell material to cool to ambient temperature and then mixing water with the cooled shell material in predetermined proportions whereupon the shell material spontaneously heats to about 210° F. The reaction of the water and shell material is allowed to continue until the mixture starts to cool add the shell material and water mixture has turned into a dry, substantially white, fluffy powdery substance of the consistency of talcum powder. As soon as the heated and cooled marine shell material and water mixture has converted to its dry white powdery state following its spontaneous heating it may be used as a mortar binder in a conventional manner without waiting for the mixture to cool to ambient temperature. The mixture, however, should not be used, until it has started to cool from its spontaneously heated temperature and the mixture has converted to the dry fluffy, substantially white powdery material described above.

In accordance with the invention, the marine shell material is heated throughout in a suitable kiln to about 2100° to 2350° F. When the temperature of the material has arrived within this range, the application of heat is stopped and the shell material allowed to cool throughout to ambient temperature. The shell material at this stage can be a brownish or greyish, coarse, or granular substance in which recognizable flakes of the shell materials in their respective colors, e.g., reddish for crab shell, greyish or brownish for oyster shells, etc. can be readily detected. Following the foregoing step, water, which can be saline and taken directly from a brackish source, such as a bay, or from the open ocean, is mixed with the now cooled coarse marine shell material with about one part of water by volume to about five parts of the cooled shell material by volume.

As the water and cooled shell material is thoroughly mixed, the temperature of the mixture spontaneously rises to about 210° F. The temperature of the mixture remains at this level for a period of time sufficient to permit the reaction to be completed, which can be determined by inserting a suitable thermometer, which may be similar to a meat thermometer, into the mixtureuntil the temperature starts to fall. At a visually recognizable point during this fall of the temperature, the previously coarse, vari-colored heated and subsequently cooled shell material and water mixture converts, without further treatment as by crushing in a ball mill, into a white or substantially white homogeneous, fluffy powdery substance having the appearance of fine-ground talcum powder. This is the finished binder.

Once the shell material and water mixture has converted into the described powdery substance it may be used as a binder in making a mortar without waiting for the material to cool to ambient temperature.

For making a mortar, additional water and any of the usual substances used in mortar such as sand and/or gravel can be mixed in a conventional manner with the binder produced in accordance with the method of the invention.

A particular advantage of a binder produced in accordance with the invention is the fact that it is entirely compatible with saline water, be it brackish or from the open ocean. It has been determined, experimentally that masonry structures wherein a binder made in accordance with the present invention and used in a mortar mixed with sea water is more durable than a mortar utilizing a conventional binder, such as Portland cement, which must be mixed with fresh water.

The invention includes within its purview the binder itself made in accordance with the method of the invention as described. It further includes, as steps to the method, the making of a mortar by mixing with the binder an inert filler material which may be sand or gravel, and additional water which may be sea water.

It should be understood that once the binder has been produced in accordance with the invention, it may be used in making any type of mortar using any ingredients suitable for mortar, such as fly ash, clay, iron dust, and sand. The sand or other materials might be from a salt-water beach or bog.

Having now described the invention, what is claimed is:

1. The method of making a cementitious binder for use in mortars comprising heating marine shell material to about 2100° to 2350° F.; allowing said shell material to cool to ambient temperature; mixing water with the cooled shell material in the ratio of about one part of water by volume to about five parts of shell material by volume; allowing said mixture to spontaneously heat; and monitoring the heat level of said mixture until it commences to cool and as it cools is converted into a dry, substantially white, powdery material substantially of the consistency of talcum powder in readiness for use as a binder in mortar.

2. The method of claim 1, including the additional steps of mixing said binder with inert filler material and then adding additional water thereto in sufficient amount to form a mortar.

3. The method of claim 2, wherein the additional water is untreated saline water from natural bodies of saline water.

4. The method of claim 3, wherein said additional water is natural sea water.

5. The method of claim 2, wherein said filler material is sand.

6. The method of claim 2, wherein said filler material is gravel.

7. A cementitious binder for mortars comprising a dry powdery material produced by the method of claim 1.

8. The method of claim 1, wherein the water mixed with the cooled shell material is saline water.

9. The method of claim 8, wherein the saline water is untreated brackish water taken from a natural source of brackish water.

10. The method of claim 8, wherein the saline water is untreated salt water taken from the open ocean.

* * * * *